(12) United States Patent
Lenz

(10) Patent No.: US 7,418,334 B2
(45) Date of Patent: Aug. 26, 2008

(54) METHOD FOR OPERATING AN INTERNAL COMBUSTION ENGINE COMPRISING AN EXHAUST GAS PURIFICATION SYSTEM

(75) Inventor: Michael Lenz, Fellbach (DE)

(73) Assignee: Daimler AG, Stuttgart (DE)

( * ) Notice: Subject to any disclaimer, the term of this patent is extended or adjusted under 35 U.S.C. 154(b) by 71 days.

(21) Appl. No.: 10/568,979

(22) PCT Filed: Aug. 11, 2004

(86) PCT No.: PCT/EP2004/008979

§ 371 (c)(1),
(2), (4) Date: Sep. 27, 2006

(87) PCT Pub. No.: WO2005/021951

PCT Pub. Date: Mar. 10, 2005

(65) Prior Publication Data

US 2007/0150154 A1   Jun. 28, 2007

(30) Foreign Application Priority Data

Aug. 22, 2003   (DE) .............................. 103 38 628

(51) Int. Cl.
 *G06F 17/00* (2006.01)
 *B06W 10/04* (2006.01)
(52) U.S. Cl. ............... 701/103; 701/54; 477/111
(58) Field of Classification Search ........ 701/103, 701/104, 108, 59; 123/478, 480, 493; 60/274; 180/197; 73/116, 119 A, 117.1–117.3, 118.2
See application file for complete search history.

(56) References Cited

U.S. PATENT DOCUMENTS

| | | | | |
|---|---|---|---|---|
| 5,213,178 | A | * | 5/1993 | Polidan et al. ............... 180/197 |
| 5,522,367 | A | | 6/1996 | Reuschenbach et al. |
| 5,529,140 | A | * | 6/1996 | Yamashita et al. .......... 180/197 |
| 5,662,084 | A | | 9/1997 | Deguchi et al. |
| 5,740,045 | A | | 4/1998 | Livshiz et al. |
| 5,889,205 | A | | 3/1999 | Treinies et al. |
| 5,995,895 | A | | 11/1999 | Watt et al. |
| 6,497,298 | B2 | * | 12/2002 | Irie et al. .................... 180/197 |

FOREIGN PATENT DOCUMENTS

| | | |
|---|---|---|
| DE | 4440640 A1 | 5/1995 |
| DE | 4440833 A1 | 2/1996 |
| DE | 4415650 C2 | 4/1997 |
| DE | 19731623 A1 | 1/1999 |
| DE | 19749400 A1 | 5/1999 |
| DE | 19902203 A1 | 7/2000 |
| EP | 1231397 A2 | 8/2002 |

* cited by examiner

*Primary Examiner*—Willis R. Wolfe, Jr.
*Assistant Examiner*—Johnny H. Hoang
(74) *Attorney, Agent, or Firm*—Crowell & Moring LLP

(57) ABSTRACT

A method for operating an internal combustion engine having an exhaust gas purification system. Intake air throttling is carried out in order to raise an exhaust gas temperature in a low-load mode and in a traction mode. The amount of intake air throttling is determined as function of an expected load demand so that, with an expected unchanged or decreasing load demand, an increased or maximum possible intake air throttling is set. With an expected rising load demand, however, no or reduced intake air throttling is set, and the expected load demand is estimated based on operating and ambient parameters of the internal combustion engine.

7 Claims, 2 Drawing Sheets

METHOD FOR OPERATING AN INTERNAL COMBUSTION ENGINE COMPRISING AN EXHAUST GAS PURIFICATION SYSTEM

BACKGROUND AND SUMMARY OF THE INVENTION

The present invention relates to a method for operating an internal combustion engine having an exhaust gas purification system, with intake air throttling being carried out in order to raise an exhaust gas temperature in a low-load mode and in a traction mode.

DE 44 15 650 C2 discloses a method for operating an internal combustion engine, in which a mass intake airflow is reduced in order to raise an exhaust gas temperature level. The reduction is to take place such that, after a fuel injection, there is a virtually stoichiometric mixture at each operating point of the internal combustion engine. This ensures that the exhaust gas temperature level is always at a maximum value for the instantaneous operating point and a catalytic converter arranged in the exhaust train of the internal combustion engine reaches its activation temperature as quickly as possible. The amount of reduction in the mass intake airflow is to be determined from a characteristic map as a function, inter alia, of the residual oxygen content in the exhaust gas. This is intended to ensure that the mixture can never become too rich even during the nonstationary operation of the internal combustion engine. When the operating temperature of the catalytic converter is already reached, the mass intake airflow is no longer reduced to the same extent as when the internal combustion engine is cold, but, instead, only to an extent such that the catalytic converter is maintained at its optimum operating temperature.

DE 197 49 400 A1 discloses a method for reducing the NOx content in the exhaust gas of a diesel internal combustion engine. In order to avoid a cooling of the exhaust gas in the overrun mode, an efficiency of the diesel internal combustion engine is deliberately impaired. For this purpose, for example, an exhaust gas recirculation rate can be reduced at the expense of a minimization of consumption.

DE 197 31 623 A1 discloses a method for operating a direct-injection diesel engine, in which a rise in the exhaust gas temperature is to be achieved by means of mass intake air throttling.

DE 44 40 833 A1 also discloses a method for operating a diesel engine, in which the exhaust gas temperature can be increased by a reduction in the mass air throughput, for example by means of an exhaust gas turbocharger of variable geometry, intake air throttling, boost pressure cutback or intake air preheating.

Modern internal combustion engines are distinguished by ever increasing efficiency, above all in the part-load range, this applying particularly to direct-injection gasoline and diesel engines. Benefits of a higher efficiency are a lower consumption, lower untreated emissions and therefore increased environmental compatibility. The improved efficiency has an adverse effect on catalytic exhaust gas aftertreatment systems, however, because less exhaust gas energy and therefore a lower exhaust gas temperature are available for heating the exhaust gas aftertreatment systems. The result of this may be that these exhaust gas aftertreatment systems reach the temperature range necessary for optimum pollutant conversion later or even never. Under certain circumstances, because of the poorer convertibility of the exhaust gas aftertreatment systems, this leads to an overall poorer emission behavior in spite of reduced untreated emission values.

In addition, this problem becomes more serious when discontinuous exhaust gas aftertreatment systems, such as NOx storage catalytic converters and/or diesel particle filters, are used. These systems require, for the conversion or removal of the stored exhaust gas constituents, for example NOx, SOx, particles, regeneration phases which, if appropriate are generated actively at regular intervals and are associated, inter alia, with marked rises in exhaust gas temperatures. Among other things, the active introduction of an afterinjection following the actual main combustion may contribute to generating these required exhaust gas temperatures. This afterinjection is converted completely or partially in the combustion space of the engine, and possibly unburned fuel can additionally be burnt on an optionally preceding oxidizing catalytic converter and actively heat the systems to be regenerated. For this purpose, however, such an oxidizing catalytic converter must be kept in the temperature window necessary for converting the introduced fuel. Furthermore, for a reduction in energy and therefore in consumption, it is advantageous to have as high an initial temperature as possible at the commencement of the active heating operation.

In systems consisting of internal combustion engines and exhaust gas aftertreatment systems which generate the necessary regeneration temperature predominantly or even only partially within the engine, the problem arises that there are engine operating states which naturally do not allow any increase in the exhaust gas temperature. This applies particularly to the overrun mode, since this is characterized by a negative engine output torque and therefore, in the overrun mode, no load-generating and therefore also no temperature-generating injection of fuel is carried out.

Since the driving state overrun mode in the motor vehicle may have a substantial fraction of an overall driving profile, it is important to keep the exhaust gas temperatures already reached as high as possible at least as long as possible, and therefore to keep the unavoidable cooling of the exhaust gas in the overrun mode as low as possible. A highly effective possibility of markedly reducing the cooling of the exhaust gas in the overrun mode is a reduction in the fresh air mass passed through the engine. The reduction may be achieved by the activation of various throttle points which may be introduced between the intake tract and the exhaust tract. The opening of an existing exhaust gas recirculation device may also reduce the cooling air throughput through the engine. Such methods operating with intake air throttling are mentioned, for example, in the aforementioned documents.

The known measures for reducing the mass air throughput by throttling actions on the fresh air side not only cause a higher exhaust gas temperature level to be maintained, but also adversely result in a changed response behavior of the vehicle. In particular, when the driver requires load after a throttled overrun phase, the response behavior becomes noticeably poorer.

Alternatively, throttling devices mounted on the exhaust gas side may ensure a reduction in the mass air throughput, but such throttling devices on the exhaust gas side, due to the induced rise in counterpressure, ensure a clearly noticeable braking torque comparable to what is known as the engine brake in motor trucks.

A further alternative for reducing the mass air throughput is to employ a bypass valve system which is mounted on the exhaust gas side and, in overrun phases, diverts exhaust gas having a high fresh air fraction around the actual active exhaust gas aftertreatment systems. However, such systems are complicated in structural terms and are costly.

An object of the present invention is to provide a method for operating an internal combustion engine having an exhaust gas purification system in which a rise in the exhaust gas temperature in low-load and overrun phases is allowed, without the response behavior of the internal combustion engine being noticeably impaired.

For this purpose, according to the invention, a method for operating an internal combustion engine comprising an exhaust gas purification system is provided, intake air throttling being carried out in order to raise an exhaust gas temperature in a low-load mode and a traction mode. An amount of intake air throttling is determined as a function of an expected load demand so that, in the case of an expected unchanged or decreasing load demand, an increased or maximum possible intake air throttling is set, and, in the case of an expected rising load demand, no or reduced intake air throttling is set. The expected load demand is estimated on the basis of operating and ambient parameters of the internal combustion engine.

The invention thus provides a method, by way of which intake air throttling can be carried out a in foresighted way, since, by the use of suitable information systems which, if appropriate, are already installed in the vehicle, the throttling rates can be adapted dynamically to the expected estimated driving behavior. This makes it possible to have temporally markedly higher throttling rates and consequently a markedly reduced cooling of existing exhaust gas temperatures, without any adverse effects on the response or driving behavior.

In particular, by virtue of the invention, the response behavior of the internal combustion engine is markedly improved after an overrun phase with a lowered mass air throughput, corresponding to what is known as throttle operation. Thus, with the present invention, the throttling rates are raised dynamically in operating phases in which no load requirement by the driver is expected, whereas the throttling rates are kept as low as possible in operating phases with a potential load requirement. The estimation of the expected load demand, this corresponding in the vehicle to an estimation of the expected behavior of a driver, is in this case to take place on the basis of sensor information and further information which reproduces current conditions from which certain possible consequential actions can be inferred.

In a development of the invention, the internal combustion engine is provided for a motor vehicle and the expected load demand is estimated as a function of a brake pedal position, of a brake pressure, of a profile of the brake pedal position and/or of a brake pressure profile.

Thus, perfectly reliable evidence of the expected load demand can be obtained, since, in an overrun phase, with the brake pedal depressed, no load requirement by the driver is to be expected. Intake air throttling can thus be increased on the basis of the interlinking of the information "overrun mode" or "low-load mode" and "brake pedal depressed". For example, the intake air throttling rate may also be increased in proportion to the travel by which the brake pedal is depressed downward. Advantageously, the profile of the brake pedal travel or of the brake pressure is also detected and evaluated, so that, even in the case of the least possible indication of a reduction in braking action, the intake air throttling rate is cut back superproportionally in a speculative way, since, if there is a reduction in the braking action, the expectation that a driver then intends to step on the gas again is justified. In this way, even in the case of a rapid change from brake to accelerator pedal, the rise in the fresh air mass required for ensuring a good response behavior can be initiated in a foresighted way. In order to improve the response behavior further after a reinforced throttling action, a dynamic air mass rise can advantageously be implemented, which, when a potential termination of the braking action by the driver is detected, has already as far as possible reduced the intake air throttling rate.

In a further development of the invention, the internal combustion engine is provided for a motor vehicle and the expected load demand is estimated as a function of a transmission position, in particular linked to a current driving speed.

For example, with a transmission gear not selected, no load requirement of the driver is to be expected. This applies particularly when the vehicle is stationary. In such an idling or lowest-load mode in which only the traction torque of the engine has to be overcome, a maximum possible intake air throttling rate can thereby be set, in order, even in the idling mode, to keep the exhaust gas temperature as high as possible and to achieve a rapid heating of the exhaust gas aftertreatment systems or an only slight cooling of the latter.

In yet another development of the invention, the internal combustion engine is provided for a motor vehicle and the expected load demand is estimated as a function of a measurement of the distance from a vehicle traveling ahead.

For example, information from a radar-assisted distance measuring instrument, what is known as a Distronic, may be used. Thus, for example, the rapid approach to a vehicle traveling ahead causes a marked lowering in the probability of a load requirement by the driver.

In a still further development of the invention, the internal combustion engine is provided for a motor vehicle and the expected load demand is estimated as a function of information on the position and/or location of the vehicle.

For this purpose, for example, information from a navigation system, for example a satellite-assisted global positioning system, may be used. If, for example, the vehicle is just approaching an intersection with traffic lights, the probability of a load requirement of the driver falls, especially when the brake pedal is depressed at the same time. Furthermore, however, for example, information on the current inclination of the vehicle may also be used. Thus, as a rule, no or only a low load requirement is to be expected during downhill travel and in the overrun mode. In this case, terrain information may also be used in a foresighted way, such as, for example, whether the vehicle is just at the start of a downhill stretch.

In a development of the invention, the internal combustion engine is provided for a motor vehicle and the expected load demand is estimated as a function of acceleration spin information.

Information on the acceleration spin, for example on a slippery surface, likewise suggests the absence of a load requirement of the driver, especially when the acceleration spin information is seen in connection with further information from an outside temperature sensor and a rain sensor. In this case, for example, information provided by a driving dynamics control system may also be used. If, for example, the driving dynamics control system brings about a reduction in the drive torque, it may be assumed that there are no load demands on the internal combustion engine.

Suitable operating and ambient parameters for estimating the expected load demand can be delivered by all systems which are capable of being able to forecast a driver's requirement with some degree of certainty. These are, for example, driver assistance systems which can provide information on the nature of terrain, traffic density, driving destinations and the like.

DETAILED DESCRIPTION OF THE DRAWINGS

Figure 1:
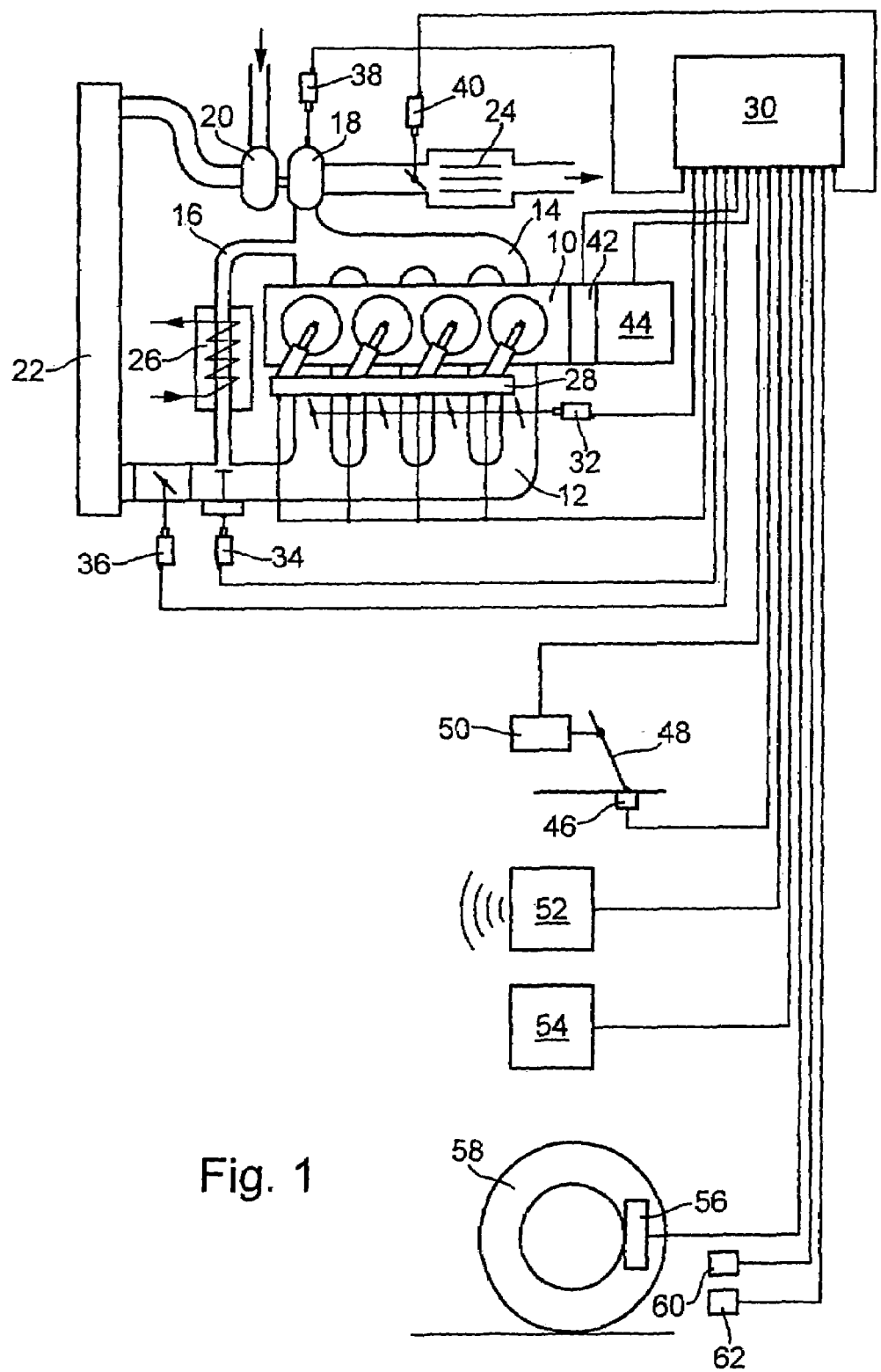
FIG. 1 is a diagrammatic illustration of an internal combustion engine for a motor vehicle which is designed for carrying out the method according to the invention.

FIG. 1 shows an internal combustion engine 10 with an intake manifold 12, an exhaust manifold 14 and an exhaust gas recirculation line 16 connecting the exhaust manifold 14 and the intake manifold 12. The exhaust manifold 14 issues into an exhaust gas turbine 18 which drives a fresh air compressor 20. The air conveyed by the compressor 20 passes via a charge air cooler 22 into the intake manifold 12. An exhaust gas purification system with a catalytic converter 24 is provided downstream of the exhaust gas turbine 18. An exhaust gas recirculation cooler 26 is arranged in the exhaust gas recirculation line 16. Fuel is injected into the combustion spaces of the internal combustion engine 10 by way of an injection system 28, each of the injection nozzles of the injection system 28 being activatable individually.

The activation of the injection system 28 is carried out by an engine control apparatus 30. In addition to the injection system 28, the engine control apparatus 30 also activates an individual throttle actuator 32, whereby individual throttle valves in each intake duct of the internal combustion engine 10 can be activated. Furthermore, the engine control apparatus 30 activates an exhaust gas recirculation actuator 34, whereby an issue of the exhaust gas recirculation line 16 into the intake manifold 12 can be opened and closed. Furthermore, by way of the engine control apparatus 30, an intake air throttle actuator 36 is activated, whereby a throttle valve in the intake manifold 12 can be set, the throttle valve being arranged upstream of the branch of the intake manifold 12 into the individual intake ducts and also upstream of the issue of the exhaust gas recirculation line 16 into the exhaust manifold 12. The exhaust gas turbine 18 has a variable turbine geometry which can be set by an exhaust gas turbine actuator 38 under the control of the engine control apparatus 30. A throttle valve downstream of the exhaust gas turbine 18 and upstream of the catalytic converter 24 is set by an exhaust gas throttle actuator 40 likewise under the control of the engine control apparatus 30.

The engine control apparatus 30 receives input signals from a rotational speed and engine torque sensor 42 and information from a transmission sensor which detects whether and which transmission gear is selected in a transmission 44. A brake pedal sensor 46 delivers information on the position of a brake pedal 48 to the engine control apparatus 30 and a brake pressure sensor 50 delivers information on a currently prevailing brake pressure to the engine control apparatus 30. A distance sensor 52 measures a distance from a vehicle traveling ahead or from an obstacle lying in the forward direction and delivers corresponding information to the engine control apparatus 30. Information on a geographic position and a location of the vehicle, corresponding, for example, to an angle of inclination to the horizontal in the forward direction, is received by the engine control apparatus 30 from a navigation system 54. An acceleration spin sensor 56 makes available to the engine control apparatus 30 information on a spin occurring on a driving wheel 58. Finally, the engine control apparatus 30 receives information from an outside temperature sensor 60 and a rain sensor 62.

The internal combustion engine 10, designed as a diesel engine, operates, as a rule, in its entire operating range as a result of the fuel mass-managed mixture formation method with an oxygen excess, corresponding to $\lambda>1$. Boundaries for the air ratio $\lambda$ apply to full-load mode, and, in nonstationary operation, the smoke limit forms a boundary. In part-load mode, in modern diesel engines, the fraction of the fresh air mass is reduced to air ratios of between $1.5<\lambda<5$ via exhaust gas recirculation by way of the exhaust gas recirculation line 16. In the part-load mode, the NOx emission is thereby markedly reduced.

Above all in operating ranges near the overrun mode, which are also designated as "false overrun", since the internal torque is lower than or equal to the traction torque plus a tolerance window, and the rotational speed is higher than the idling rotational speed, and in the limit case of the overrun mode, which is characterized by an accelerator pedal position of 0% and an injection quantity of 0, caused by the overrun cut-off, the diesel engine operates with a very marked air excess in ranges of $5<\lambda<\infty$ because of the low or absent injection quantity. These operating ranges near the overrun mode are distinguished in that no or only a very low drive torque is present on the engine output shaft, that is the engine operates in the zero-load or lowest-load range. In this case, very little fuel is converted in the case of a very high air excess, thus resulting in very low exhaust gas temperatures. To be precise, the air excess not necessary for the combustion of the fuel has a cooling effect on the entire internal combustion engine 10 and therefore also on the exhaust gas. Particularly at higher rotational speeds and therefore at higher mass air throughput, a large amount of cooling fresh air is conveyed through the exhaust manifold 14, the exhaust gas turbine 18 and the catalytic converter 24 in these operating ranges. Under certain circumstances, this prevents an active heating of the catalytic converter 24 to higher temperatures or delays the response of the convertibility or storability of the catalytic converter 24 or of further exhaust gas aftertreatment systems.

In order to achieve or maintain the exhaust gas temperatures in the abovementioned operating ranges, to be precise the low-load range and overrun range, it is helpful to reduce the air supply through the intake manifold 12 to what is necessary and, in the overrun cut-off range, ideally as far as possible. As a result, higher exhaust gas temperatures can be achieved or the existing exhaust gas temperatures can be held for longer. Intake air throttling, as it is known, has the disadvantage of changed response behavior of the vehicle after an overrun phase with a reduced air mass. This impaired response behavior results from the unavoidable idle times or delay times which are required in order to make available again the air required for a dynamic engine behavior. In conventional methods, therefore, in a setting of the intake air throttling rate, a compromise is reached between a still acceptable response behavior and a likewise still acceptable generation of exhaust gas temperature or maintaining of exhaust gas temperature.

By contrast, with the present invention, a markedly higher intake air throttling can be achieved in the low-load range and in the overrun range of the internal combustion engine 10, without the response behavior of the internal combustion engine 10 in the case of a load requirement following a throttling phase being noticeably impaired. This is achieved in that the engine control apparatus 30 can estimate an expected load demand on the internal combustion engine 10 so that an intake air throttling rate is set on the basis of this estimated load demand. This takes place in that, in the case of an expected unchanged or decreasing load demand, an increased or maximum possible intake air throttling is set, and, in the case of an expected rising load demand, no or reduced intake air throttling is set.

The estimation of the expected load demand takes place within the engine control apparatus 30 on the basis of operating and ambient parameters of the internal combustion engine 10.

These operating and ambient parameters relate, for example, to the position of the brake pedal 48 which is detected by the brake pedal sensor 46. Furthermore, a currently prevailing brake pressure is detected by the brake pressure sensor 50. If the brake pedal 48 is additionally depressed, for example, during an overrun phase, then no load requirement of the driver is to be expected during the time while the brake pedal 48 is depressed. Consequently, by an appropriate activation of the intake air throttle actuator 36, the engine control apparatus 30 increases an intake air throttling rate to a maximum possible value.

Furthermore, a profile of the position of the brake pedal 48 and a brake pressure profile are determined and evaluated by the brake pedal sensor 46 and the brake pressure sensor 50. If, for example, the brake pedal 48 is still depressed, but the brake pressure and the brake pedal position are already cut back, the probability that a rise in load demand will occur increases. Consequently, the engine control apparatus 30 will cut back the intake throttling rate or set it completely at zero. Such a dynamic and foresighted air mass rise can also be achieved by the engine control apparatus 30, for example, via an activation of the exhaust gas turbine actuator 38 and of the exhaust gas recirculation actuator 34.

When the engine control apparatus 30 receives, for example, information from the transmission sensor that precisely no transmission gear is selected in a transmission 44, the engine control apparatus 30 can assume that no rising load demand is to be expected. This applies even more when the information that the vehicle is just stationary is transmitted simultaneously to the engine control apparatus 30. Consequently, with a transmission gear not selected, the engine control apparatus 30 can set the intake air throttling rate to a maximum possible value. By contrast, when a transmission gear is selected, a load requirement is shortly to be expected, so that the engine control apparatus 30 will consequently cut back the intake air throttling or set it at zero.

The signals from the distance sensor 52 are evaluated in a similar way. If, for example, a rapid approach to a vehicle traveling ahead is detected by the distance sensor 53, the engine control apparatus 30 can assume an increased probability of the absence of a load requirement.

Information from the navigation system 54 is also used by the engine control apparatus 30 in order to estimate expected load demand. Thus, for example, in the case of an approach to an intersection and a simultaneously reduced driving speed or a depressed brake pedal 48, it can be assumed that no rising load demand will follow.

Finally, if the acceleration spin sensor 56 detects an acceleration spin and at the same time, because of information from the outside temperature sensor 60 and from the rain sensor 62, a slippery surface or wetness can be inferred, the engine control apparatus 30 can assume that no or only a slightly rising load demand is to be expected and can therefore set intake air throttling.

The operating and ambient parameters of the internal combustion engine 10 which are detected by the various sensors listed may in this case be taken into account simultaneously and, for example, be prioritized differently. Furthermore, the need for intake air throttling may also be graded differently according to a need for higher exhaust gas temperatures for the purpose of the exhaust gas aftertreatment system having the catalytic converter 24. This is necessary, under certain circumstances, in order to keep disadvantages in the dynamic response behavior of the internal combustion engine 10, following an overrun mode or low-load mode, as inconspicuous as possible and not noticeable by a driver.

When intake air throttling is set via the engine control apparatus 30 in the low-load mode or in the overrun mode, for example, a stationary and nonstationary regulation of the reduced air mass is also carried out via corresponding command variables, for example lambda, air mass, suction pipe pressure, exhaust gas backpressure and/or physical smoke limit. Furthermore, the engine control apparatus 30 can carry out adaptation to changed environmental or operating conditions, for example to atmospheric pressure, outside air temperature, variation in the exhaust gas backpressure, intake air temperature, exhaust gas temperature, catalytic converter temperature and/or engine temperature.

Figure 2:
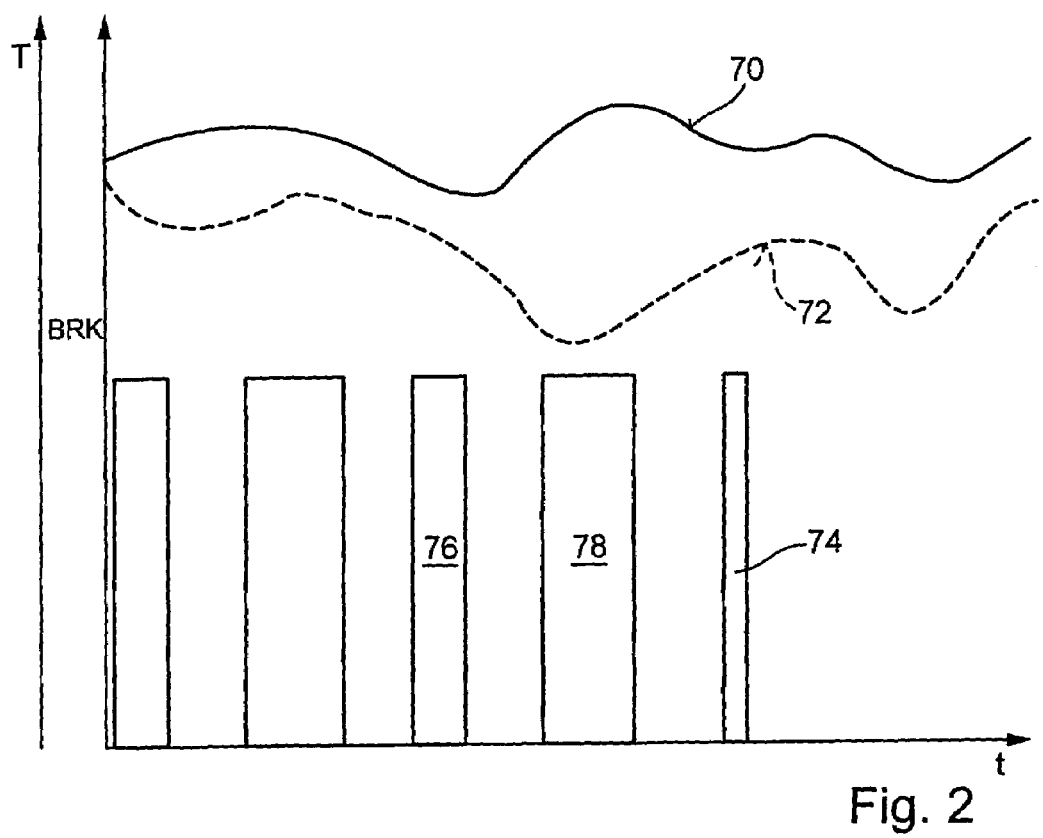
FIG. 2 is a graph comparing exhaust gas temperature profiles which are achieved by the method according to the invention and a conventional method.

In FIG. 2, an unbroken line 70 shows qualitatively the profile of an exhaust gas temperature of the internal combustion engine 10 when the latter is operated according to the invention. In comparison with this, a broken line 72 illustrates the profile for the exhaust gas temperature in an internal combustion engine operated conventionally. The exhaust gas temperatures T are plotted in each case against the time t. In addition, braking actions BRK by a driver are plotted, likewise against the time t, by a curve 74. It may be gathered from the graph of FIG. 2 that, by virtue of the invention, higher and, furthermore, even less sharply fluctuating exhaust gas temperatures 70 are achieved in real driving conditions. Especially in the overrun mode with additional braking actions 76 and 78, by virtue of the invention, not only can a cooling of the exhaust gas, such as can be seen from the curve 72, be prevented, but, furthermore, even a heating of the exhaust gas according to the curve 70 can be achieved.

The invention claimed is:

1. A method for operating an internal combustion engine having an exhaust gas purification system and improved response behavior, comprising:
   estimating an expected load demand based on operating and ambient parameters of the internal combustion engine,
   setting an increased or maximum possible intake air throttling with an expected unchanged or decreasing load demand, and
   eliminating or setting a reduced intake air throttling with an expected rising load demand,
   wherein an amount of intake air throttling as a function of the expected load demand is estimated so that an exhaust gas temperature can rise in a low-load mode and in a traction mode.

2. The method as claimed in claim 1, wherein the internal combustion engine is a motor vehicle engine, and the expected load demand is estimated as a function of a transmission position.

3. The method as claimed in claim 2, wherein the estimated expected load demand is linked to current driving speed.

4. The method as claimed in claim 1, wherein the internal combustion engine is a motor vehicle engine, and the expected load demand is estimated as a function of a measurement of the distance from a vehicle traveling ahead.

5. The method as claimed in claim 1, wherein the internal combustion engine is a motor vehicle engine, and the expected load demand is estimated as a function of information on at least one of position and location of the vehicle.

6. The method as claimed in claim 1, wherein the internal combustion engine is a motor vehicle engine, and the expected load demand is estimated as a function of acceleration spin information.

7. A method for operating an internal combustion engine having an exhaust gas purification system, comprising carrying out intake air throttling to raise an exhaust gas temperature in a low-load mode and in a traction mode, determining an amount of intake air throttling as a function of an expected load demand so that, with an expected unchanged or decreasing load demand, an increased or maximum possible intake air throttling is set, and, with an expected rising load demand, no or a reduced intake air throttling is set, wherein the expected load demand is estimated based on operating and ambient parameters of the internal combustion engine wherein the internal combustion engine is a motor vehicle engine, and the expected load demand is estimated as a function of at least one of a brake pedal position, a brake pressure, a profile of the brake pedal position and a brake pressure profile.

* * * * *